United States Patent
Kuo

(10) Patent No.: US 12,395,919 B2
(45) Date of Patent: Aug. 19, 2025

(54) METHOD AND APPARATUS FOR A RELAY UE SUPPORTING CONNECTION WITH ANOTHER REMOTE UE IN A WIRELESS COMMUNICATION SYSTEM

(71) Applicant: ASUSTek Computer Inc., Taipei (TW)

(72) Inventor: Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 356 days.

(21) Appl. No.: 18/078,468

(22) Filed: Dec. 9, 2022

(65) Prior Publication Data

US 2023/0217346 A1 Jul. 6, 2023

Related U.S. Application Data

(60) Provisional application No. 63/296,293, filed on Jan. 4, 2022.

(51) Int. Cl.
  *H04W 40/24* (2009.01)
  *H04W 40/22* (2009.01)
  *H04W 76/14* (2018.01)

(52) U.S. Cl.
  CPC ......... *H04W 40/22* (2013.01); *H04W 40/246* (2013.01); *H04W 76/14* (2018.02)

(58) Field of Classification Search
  CPC ... H04W 40/22; H04W 40/24; H04W 40/246; H04W 76/10; H04W 76/11; H04W 76/14; H04W 76/15; H04W 76/20; H04W 76/23; H04W 88/02; H04W 88/04; H04W 4/40; H04W 4/46; H04W 8/005; H04W 28/02; H04W 28/021; H04W 28/0268; H04W 92/16; H04W 92/18; H04B 7/04; H04B 7/0413; H04B 7/15; H04B 7/155
  See application file for complete search history.

(56) References Cited

U.S. PATENT DOCUMENTS

2023/0224778 A1* 7/2023 Perras .................. H04W 36/037
  370/331
2023/0371094 A1* 11/2023 Xu ........................ H04W 76/14
(Continued)

OTHER PUBLICATIONS

3GPP TS 23.304 V17.0.0 (Sep. 2021), (Year: 2021).*
(Continued)

*Primary Examiner* — Paul H. Masur
(74) *Attorney, Agent, or Firm* — Blue Capital Law Firm

(57) ABSTRACT

A method and device are disclosed for a relay User Equipment (UE) supporting connection with another UE. In one embodiment, the method includes a relay UE establishing a first PC5 unicast link with the first UE and establishing a second PC5 unicast link with a second UE. The method also includes the relay UE forwarding data from the first UE to the second UE. The method further includes the relay UE receiving a Link Modification Request message from the first UE, wherein the Link Modification Request message includes a third User Info of a third UE. In addition, the method includes the relay UE transmitting a Direct Communication Request message to the third UE, wherein the Direct Communication Request message includes the third User Info of the third UE. Furthermore, the method includes the relay UE receiving a Direct Communication Accept message from the third UE.

20 Claims, 16 Drawing Sheets

(56) References Cited

U.S. PATENT DOCUMENTS

2024/0196206 A1\* 6/2024 Fu .......................... G06F 21/602
2024/0422725 A1\* 12/2024 Vogedes ................ H04W 4/025

OTHER PUBLICATIONS

3GPP, "Vehicle-to-Everything (V2X) services", 3GPP, Mar. 2020, TS 23.287 V16.2.0, pp. 1-53 (Year: 2020).\*
3GPP, "Proximity based Services (ProSe) in the 5G System (5GS)", 3GPP, Dec. 2021, TS 23.304 V17.1.0, pp. 1-99 (Year: 2021).\*
3GPP, "(ProSe) in the 5G System (5GS)", Mar. 2021, 3GPP TR 23.752, pp. 1-183 (Year: 2021).\*
3GPP, "Proximity-services (ProSe) in 5G System (5GS) protocol aspects", 3GPP, Dec. 2021, TS 24.554 V1.0.0, pp. 1-248 (Year: 2021).\*
3GPP, "Radio Resource Control (RRC) protocol specification", 3GPP, Jul. 2020, TS 38.331 V16.1.0, pp. 1-906 (Year: 2020).\*
3GPP, "Study on NR sidelink relay", 3GPP, Mar. 2021, TR 38.836 V17.0.0, pp. 1-26 (Year: 2021).\*
Thomson et al., "IPv6 Stateless Address Autoconfiguration", IETF, Sep. 2007, RFC 4862, pp. 1-30 (Year: 2007).\*

\* cited by examiner

METHOD AND APPARATUS FOR A RELAY UE SUPPORTING CONNECTION WITH ANOTHER REMOTE UE IN A WIRELESS COMMUNICATION SYSTEM

CROSS-REFERENCE TO RELATED APPLICATIONS

The present Application claims the benefit of U.S. Provisional Patent Application Ser. No. 63/296,293 filed on Jan. 4, 2022, the entire disclosure of which is incorporated herein in its entirety by reference.

FIELD

This disclosure generally relates to wireless communication networks, and more particularly, to a method and apparatus for a relay User Equipment (UE) supporting connection with another remote UE in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for a relay User Equipment (UE) supporting connection with another UE. In one embodiment, the method includes a relay UE establishing a first PC5 unicast link with the first UE and establishing a second PC5 unicast link with a second UE. The method also includes the relay UE forwarding data from the first UE to the second UE. The method further includes the relay UE receiving a Link Modification Request message from the first UE, wherein the Link Modification Request message includes a third User Info of a third UE. In addition, the method includes the relay UE transmitting a Direct Communication Request message to the third UE, wherein the Direct Communication Request message includes the third User Info of the third UE. Furthermore, the method includes the relay UE receiving a Direct Communication Accept message from the third UE. The method also includes the relay UE transmitting a Link Modification Accept message to the first UE in response to reception of the Direct Communication Accept message.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TR 23.752 V17.0.0, "Study on system enhancement for Proximity based services (ProSe) in the 5G System (5GS) (Release 17)"; TS 23.287 V16.2.0, "Architecture enhancements for 5G System (5GS) to support Vehicle-to-Everything (V2X) services (Release 16)"; TR 38.836 V17.0.0, "Study on NR sidelink relay (Release 17)"; and TS 38.331 V16.4.1, "NR; Radio Resource Control (RRC) protocol specification (Release 17)". The standards and documents listed above are hereby expressly incorporated by reference in their entirety.

Figure 1:
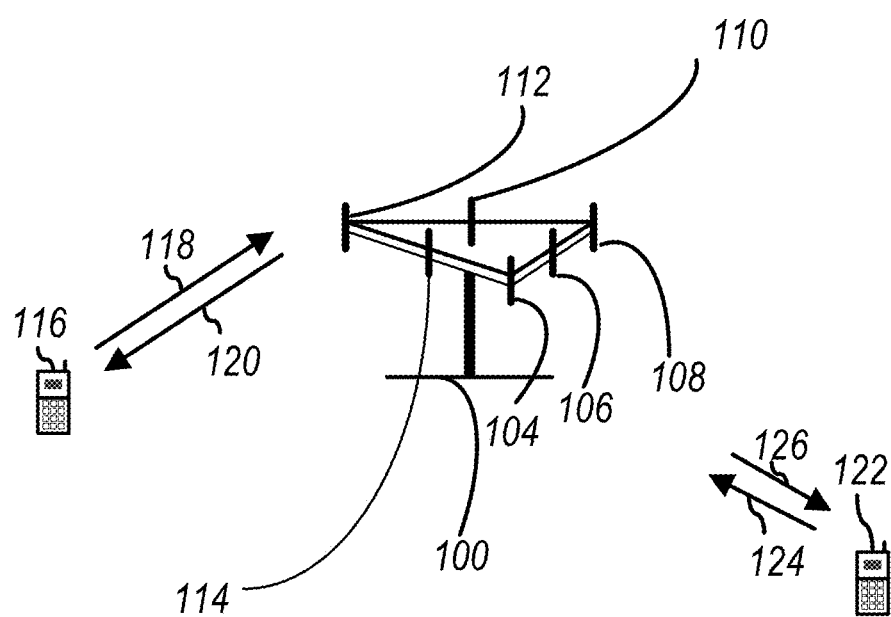
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
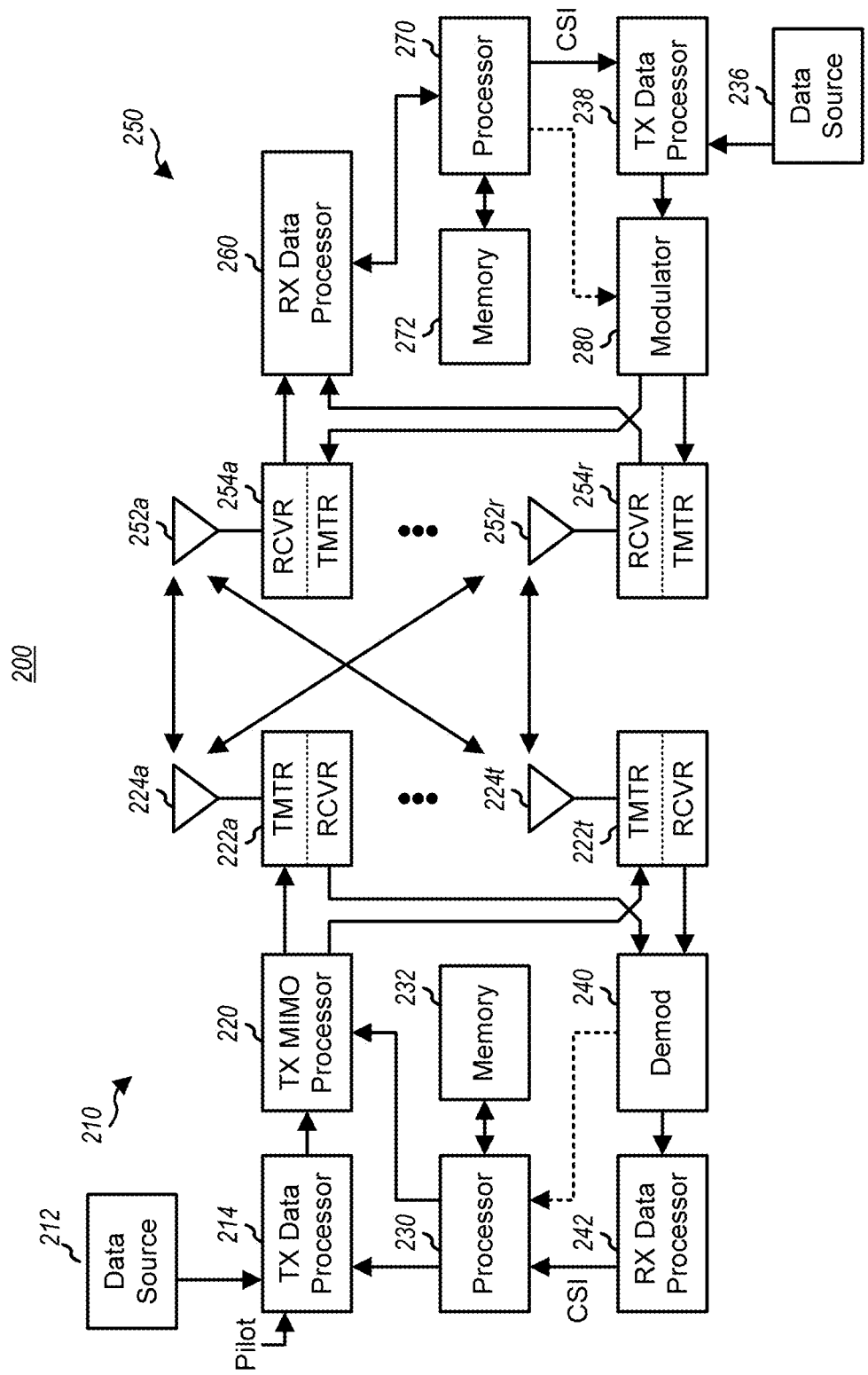
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
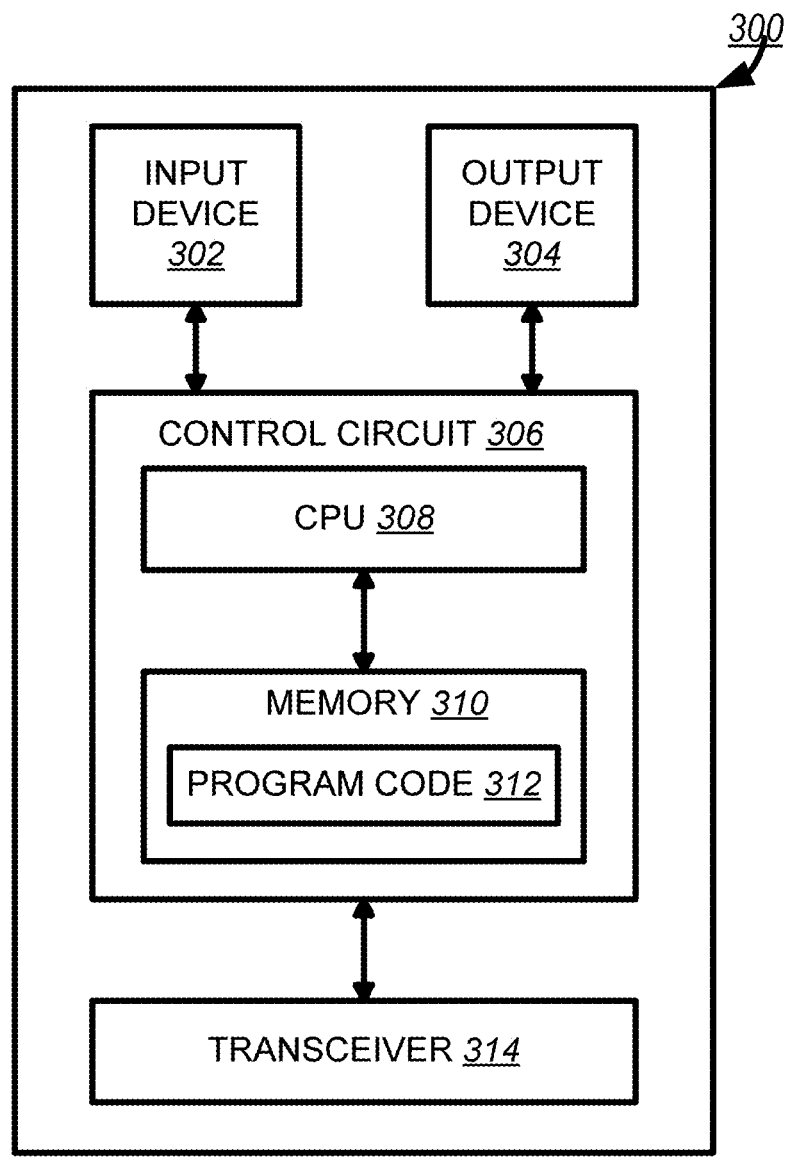
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
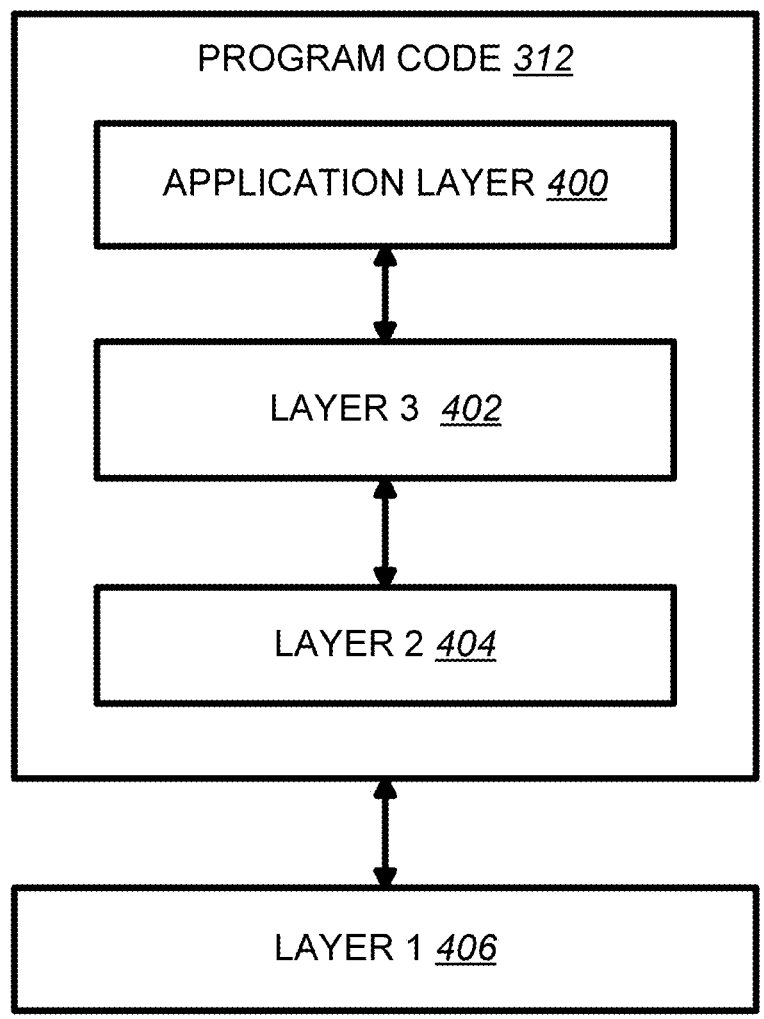
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TR 23.752 proposes to support UE-to-UE Relay and related solutions for the following release (e.g., Release 17/18) as follows:

5.4 Key Issue #4: Support of UE-to-UE Relay
5.4.1 General Description

This key issue intends to support for UE-to-UE Relay, including support for in coverage and out of coverage operation.

At least the following aspects need to be considered in potential solutions:

How to (re)-select a UE-to-UE Relay UE in proximity?
Whether and how for the network can control the UE-to-UE Relay operation, at least including how to:
Authorize the UE-to-UE Relay, e.g. authorize a UE as UE-to-UE Relay?
Authorize the Remote UE to access a UE-to-UE Relay?
Provide the visibility of source/target UE and the UE-to-UE Relay to the network for the purpose of, e.g. charging?
How to establish the connection between the source UE and the target UEs via UE-to-UE Relay?
How to provide end-to-end QoS framework to satisfy the QoS requirements (such as data rate, reliability, latency)?
How to enhance the system architecture to provide the security protection for relayed connection?
How to provide a mechanism for path changing in case of e.g. UE-to-UE Relay changes?
NOTE 1: For the involvement of NG-RAN, coordination with RAN WGs is needed.
NOTE 2: For security aspects, coordination with SA WG3 is needed.

[ . . . ]

6.8 Solution #8: UE-to-UE Relay Selection Without Relay Discovery
6.8.1 Description When a source UE wants to communicate with a target UE, it will first try to find the target UE by either sending a Direct Communication Request or a Solicitation message with the target UE info. If the source UE cannot reach the target UE directly, it will try to discover a UE-to-UE relay to reach the target UE which may also trigger the relay to discover the target UE. To be more efficient, this solution tries to integrate target UE discovery and UE-to-UE relay discovery and selection together, including two alternatives:

Alternative 1: UE-to-UE relay discovery and selection can be integrated into the unicast link establishment procedure as described in clause 6.3.3 of TS 23.287 [5].

Alternative 2: UE-to-UE relay discovery and selection is integrated into Model B direct discovery procedure.

A new field is proposed to be added in the Direct Communication Request or the Solicitation message to indicate whether relays can be used in the communication. The field can be called relay_indication. When a UE wants to broadcast a Direct Communication Request or a Solicitation message, it indicates in the message whether a UE-to-UE relay could be used. For Release 17, it is assumed that the value of the indication is restricted to single hop. When a UE-to-UE relay receives a Direct Communication Request or a Solicitation message with the relay_indication set, then it shall decide whether to forward the message (i.e. modify the message and broadcast it in its proximity), according to e.g. Relay Service Code if there is any, Application ID, authorization policy (e.g. relay for specific ProSe Service), the current traffic load of the relay, the radio conditions between the source UE and the relay UE, etc.

It may exist a situation where multiple UE-to-UE relays can be used to reach the target UE or the target UE may also directly receive the Direct Communication Request or Solicitation message from the source UE. The target UE may choose which one to reply according to e.g. signal strength, local policy (e.g. traffic load of the UE-to-UE relays), Relay Service Code if there is any or operator policies (e.g. always prefer direct communication or only use some specific UE-to-UE relays).

The source UE may receive the responses from multiple UE-to-UE relays and may also from the target UE directly, the source UE chooses the communication path according to e.g. signal strength or operator policies (e.g. always prefer direct communication or only use some specific UE-to-UE relays).

6.8.2 Procedures
6.8.2.1 UE-to-UE Relay Discovery and Selection is Integrated Into the Unicast Link Establishment Procedure (Alternative 1)

Figure 5:
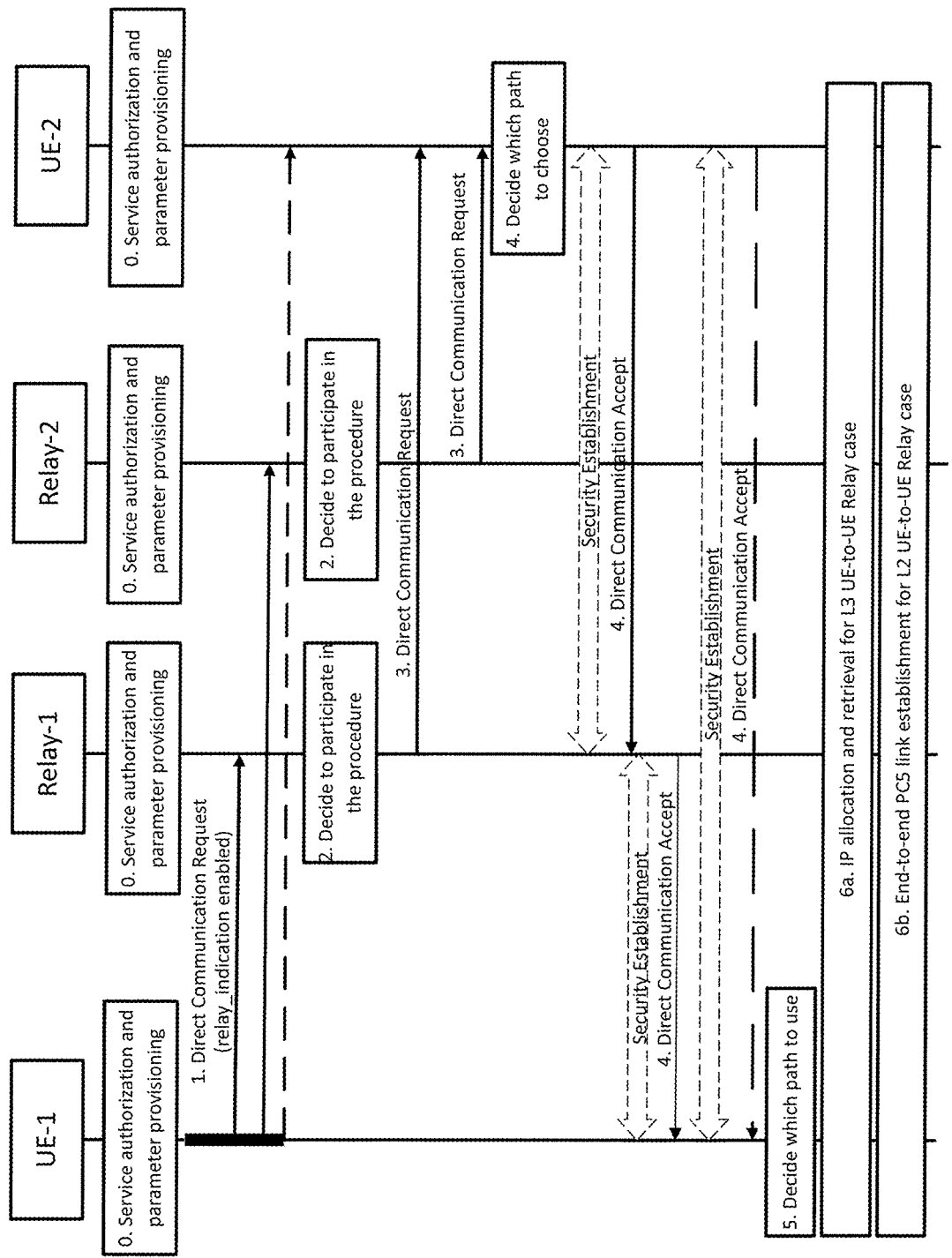
FIG. 5 is a reproduction of Figure 6.8.2.1-1 of 3GPP TR 23.752 V17.0.0.
Figure 6:
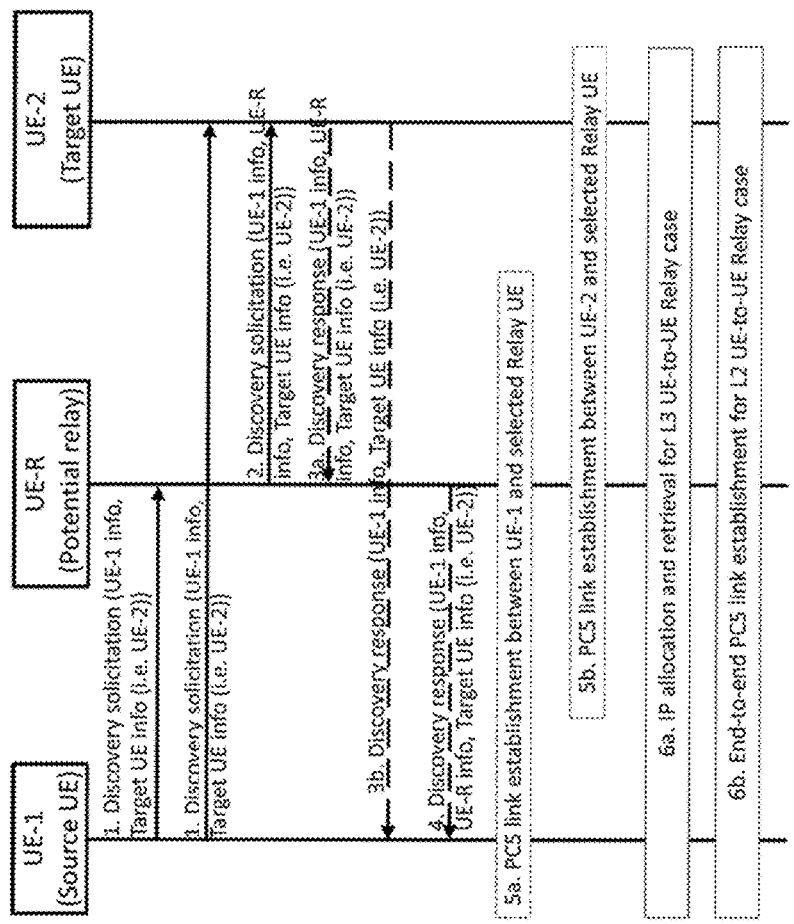
FIG. 6 is a reproduction of Figure 6.8.2.2-1 of 3GPP TR 23.752 V17.0.0.

[Figure 6.8.2.1-1 of 3GPP TR 23.752 V17.0.0, Entitled "5G ProSe UE-to-UE Relay Selection (Alternative 1)", is Reproduced as FIG. 5]

Figure 6.8.2.1-1 illustrates the procedure of the proposed method.

0. UEs are authorized to use the service provided by the UE-to-UE relays. UE-to-UE relays are authorized to provide service of relaying traffic among UEs. The authorization and the parameter provisioning can use solutions for KI #8, e.g. Sol #36. The authorization can be done when UEs/relays are registered to the network. Security related parameters may be provisioned so that a UE and a relay can verify the authorization with each other if needed.

1. UE-1 wants to establish unicast communication with UE-2 and the communication can be either through direct link with UE-2 or via a UE-to-UE relay. Then UE-1 broadcasts Direct Communication Request with relay_indication enabled. The message will be received by relay-1, relay-2. The message may also be received by UE-2 if it is in the proximity of UE-1. UE-1 includes source UE info, target UE info, Application ID, as well as Relay Service Code if there is any. If UE-1 does not want relay to be involved in the communication, then it will made relay_indication disabled.

NOTE 1: The data type of relay_indication can be determined in Stage 3. Details of Direct Communication Request/Accept messages will be determined in stage 3.

2. Relay-1 and relay-2 decide to participate in the procedure. They broadcast a new Direct Communication Request message in their proximity without relay_indication enabled. If a relay receives this message, it will just drop it. When a relay broadcasts the Direct Communication Request message, it includes source UE info, target UE info and Relay UE info (e.g. Relay UE ID) in the message and use Relay's L2 address as the source Layer-2 ID. The Relay maintains association between the source UE information (e.g. source UE L2 ID) and the new Direct Communication Request.
3. UE-2 receives the Direct Communication Requests from relay-1 and relay-2. UE-2 may also receive Direct Communication Request message directly from the UE-1 if the UE-2 is in the communication range of UE-1.
4. UE-2 chooses relay-1 and replies with Direct Communication Accept message. If UE-2 directly receives the Direct Communication Request from UE-1, it may choose to setup a direct communication link by sending the Direct Communication Accept message directly to UE-1. After receiving Direct Communication Accept, a UE-to-UE relay retrieves the source UE information stored in step 2 and sends the Direct Communication Accept message to the source UE with its Relay UE info added in the message.

After step 4, UE-1 and UE-2 have respectively setup the PC5 links with the chosen UE-to-UE relay.

NOTE 2: The security establishment between the UE1 and Relay-1, and between Relay-1 and UE-2 are performed before the Relay-1 and UE-2 send Direct Communication Accept message. Details of the authentication/security establishment procedure are determined by SA WG3. The security establishment procedure can be skipped if there already exists a PC5 link between the source (or target) UE and the relay which can be used for relaying the traffic.

5. UE-1 receives the Direct Communication Accept message from relay-1. UE-1 chooses path according to e.g. policies (e.g. always choose direct path if it is possible), signal strength, etc. If UE-1 receives Direct Communication Accept/Response message request accept directly from UE-2, it may choose to setup a direct PC5 L2 link with UE-2 as described in clause 6.3.3 of TS 23.287 [5], then step 6 is skipped.

6a. For the L3 UE-to-UE Relay case, UE-1 and UE-2 finish setting up the communication link via the chosen UE-to-UE relay. The link setup information may vary depending on the type of relay, e.g. L2 or L3 relaying. Then UE-1 and UE-2 can communicate via the relay. Regarding IP address allocation for the source/remote UE, the addresses can be either assigned by the relay or by the UE itself (e.g. link-local IP address) as defined in clause 6.3.3 of TS 23.287 [5].

6b. For the Layer 2 UE-to-UE Relay case, the source and target UE can setup an end-to-end PC5 link via the relay. UE-1 sends a unicast E2E Direct Communication Request message to UE-2 via the Relay-1, and UE-2 responds with a unicast E2E Direct Communication Accept message to UE-1 via the Relay-1. Relay-1 transfers the messages based on the identity information of UE-1/UE-2 in the Adaptation Layer.

NOTE 3: How Relay-1 can transfer the messages based on the identity information of UE-1/UE-2 in the Adaptation Layer requires cooperation with RAN2 during the normative phase.

NOTE 4: In order to make a relay or path selection, the source UE can setup a timer after sending out the Direct Communication Request for collecting the corresponding response messages before making a decision. Similarly, the target UE can also setup a timer after receiving the first copy of the Direct Communication Request/message for collecting multiple copies of the message from different paths before making a decision.

NOTE 5: In the first time when a UE receives a message from a UE-to-UE relay, the UE needs to verify if the relay is authorized be a UE-to-UE relay. Similarly, the UE-to-UE relay may also need to verify if the UE is authorized to use the relay service. The verification details and the how to secure the communication between two UEs through a UE-to-UE relay is to be defined by SA WG3.

6.8.2.2 UE-to-UE Relay Discovery and Selection is Integrated Into Model B Direct Discovery Procedure (Alternative 2)

Depicted in Figure 6.8.2.2-1 is the procedure for UE-UE Relay discovery Model B, and the discovery/selection procedure is separated from hop by hop and end-to-end link establishment.

[Figure 6.8.2.2-1 of 3GPP TR 23.752 V17.0.0, Entitled "5G ProSe UE-to-UE Relay Selection (Alternative 2)", is Reproduced as FIG. 6]

1. UE-1 broadcasts discovery solicitation message carrying UE-1 info, target UE info (UE-2), Application ID, Relay Service Code if any, the UE-1 can also indicate relay_indication enabled.
2. On reception of discovery solicitation, the candidate Relay UE-R broadcasts discovery solicitation carrying UE-1 info, UE-R info, Target UE info. The Relay UE-R uses Relay's L2 address as the source Layer-2 ID.
3. The target UE-2 responds the discovery message. If the UE-2 receives discovery solicitation message in step 1, then UE-2 responds discovery response in step 3b with UE-1 info, UE-2 info. If not and UE-2 receives discovery solicitation in step 2, then UE-2 responds discovery response message in step 3a with UE-1 info, UE-R info, UE-2 info.
4. On reception of discovery response in step 3a, UE-R sends discovery response with UE-1 info, UE-R info, UE-2 info. If more than one candidate Relay UEs responding discovery response message, UE-1 can select one Relay UE based on e.g. implementation or link qualification.
5. The source and target UE may need to setup PC5 links with the relay before communicating with each other. Step 5a can be skipped if there already exists a PC5 link between the UE-1 and UE-R which can be used for relaying. Step 5b can be skipped if there already exists a PC5 link between the UE-2 and UE-R which can be used for relaying.
6a. Same as step 6a described in clause 6.8.2.1.
6b. For the Layer-2 UE-to-UE Relay, the E2E unicast Direct Communication Request message is sent from UE1 to the selected Relay via the per-hop link (established in steps 5a) and the Adaptation layer info identifying the peer UE (UE3) as the destination. The UE-to-UE Relay transfers the E2E messages based on the identity information of peer UE in the Adaptation Layer. The initiator (UE1) knows the Adaptation layer info identifying the peer UE (UE3) after a discovery procedure. UE3 responds with E2E unicast Direct Communication Accept message in the same way.

NOTE 1: For the Layer 2 UE-to-UE Relay case, whether step 5b is performed before step 6b or triggered during step 6b will be decided at normative phase.

NOTE 2: How Relay-1 can transfer the messages based on the identity information of UE-1/UE-2 in the Adaptation Layer requires cooperation with RAN2 during the normative phase.

6.8.3 Impacts on Services, Entities and Interfaces

UE Impacts to Support New Relay Related Functions.

3GPP TS 23.287 specifies unicast mode V2X communication over PC5 reference point, Layer-2 link establishment over PC5 reference point, link identifier update, and layer-2 link modification as follows:

5.2.1.4 Unicast Mode Communication Over PC5 Reference Point

Unicast mode of communication is only supported over NR based PC5 reference point. Figure 5.2.1.4-1 illustrates an example of PC5 unicast links.

Figure 7:
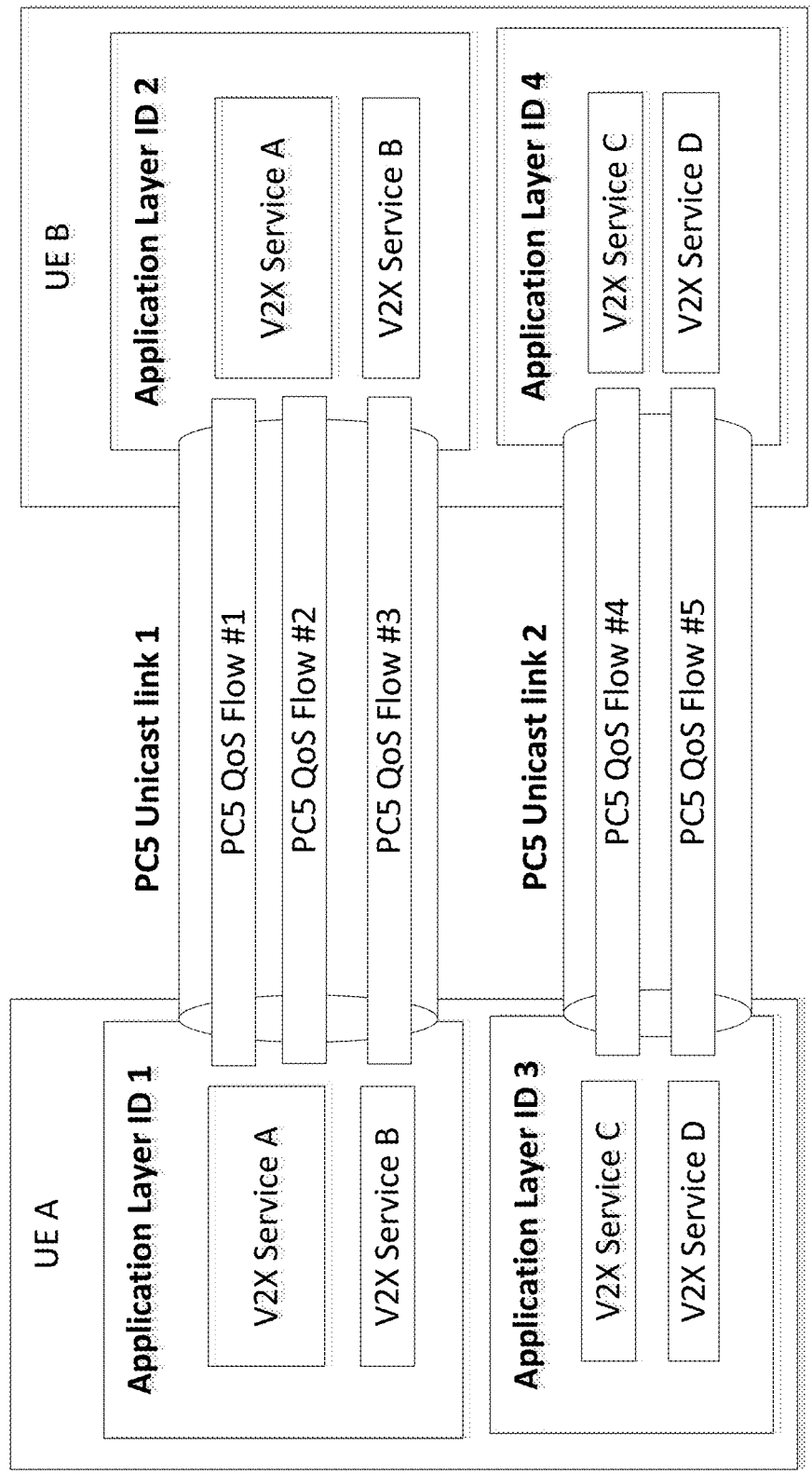
FIG. 7 is a reproduction of Figure 5.2.1.4-1 of 3GPP TS 23.287 V16.2.0.

[Figure 5.2.1.4-1 of 3GPP TS 23.287 V16.2.0, Entitled "Example of PC1 Unicast Links", is Reproduced as FIG. 7]

The following principles apply when the V2X communication is carried over PC5 unicast link:

A PC5 unicast link between two UEs allows V2X communication between one or more pairs of peer V2X services in these UEs. All V2X services in the UE using the same PC5 unicast link use the same Application Layer ID.

NOTE 1: An Application Layer ID can change in time as described in clauses 5.6.1.1 and 6.3.3.2, due to privacy. This does not cause a re-establishment of a PC5 unicast link. The UE triggers a Link Identifier Update procedure as specified in clause 6.3.3.2.

One PC5 unicast link supports one or more V2X service types (e.g. PSIDs or ITS-AIDS) if these V2X service types are at least associated with the pair of peer Application Layer IDs for this PC5 unicast link. For example, as illustrated in Figure 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.

NOTE 2: A source UE is not required to know whether different target Application Layer IDs over different PC5 unicast links belong to the same target UE.

A PC5 unicast link supports V2X communication using a single network layer protocol e.g. IP or non-IP.

A PC5 unicast link supports per-flow QoS model as specified in clause 5.4.1.

When the Application layer in the UE initiates data transfer for a V2X service type which requires unicast mode of communication over PC5 reference point:

the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service type as specified in clause 6.3.3.4; otherwise the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response/Ack, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:

V2X service type(s) (e.g. PSID(s) or ITS-AID(s)); and
Application Layer ID and Layer-2 ID of UE A; and
Application Layer ID and Layer-2 ID of UE B; and
network layer protocol used on the PC5 unicast link; and
for each V2X service type, a set of PC5 QoS Flow Identifier(s) (PFI(s)). Each PFI is associated with QoS parameters (i.e. PQI).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one V2X service type (e.g. the UE establishes multiple unicast links with multiple UEs for a same V2X service type).

The Unicast Link Profile shall be updated accordingly after a Layer-2 link modification for an established PC5 unicast link as specified in clause 6.3.3.4 or Layer-2 link identifier update as specified in clause 6.3.3.2.

V2X Service Info and QoS Info are carried in PC5-S signalling messages and exchanged between two UEs as specified in clause 6.3.3. Based on the exchanged information, PFI is used to identify V2X service. When the receiving UE receives V2X service data over the established PC5 unicast link, the receiving UE determines the appropriate V2X service based on the PFI to forward the received V2X service data to the upper layer.

Upon receiving an indication from the AS layer that the PC5-RRC connection was released due to RLF, the V2X layer in the UE locally releases the PC5 unicast link associated with this PC5-RRC connection. The AS layer uses PC5 Link Identifier to indicate the PC5 unicast link whose PC5-RRC connection was released.

When the PC5 unicast link has been released as specified in clause 6.3.3.3, the V2X layer of each UE for the PC5 unicast link informs the AS layer that the PC5 unicast link has been released. The V2X layer uses PC5 Link Identifier to indicate the released unicast link.

[ . . . ]

5.6.1.4 Identifiers for Unicast Mode V2X Communication over PC5 Reference Point

For unicast mode of V2X communication over PC5 reference point, the destination Layer-2 ID used depends on the communication peer. The Layer-2ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the V2X service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

Based on privacy configuration as specified in clause 5.1.2.1, the update of the new identifiers of a source UE to the peer UE for the established unicast link may cause the peer UE to change its Layer-2 ID and optionally IP address/prefix if IP communication is used as defined in clause 6.3.3.2.

A UE may establish multiple PC5 unicast links with a peer UE and use the same or different source Layer-2 IDs for these PC5 unicast links.

[ . . . ]

6.3.3.1 Layer-2 Link Establishment Over PC5 Reference Point

To perform unicast mode of V2X communication over PC5 reference point, the UE is configured with the related information as described in clause 5.1.2.1.

Figure 6.3.3.1-1 shows the layer-2 link establishment procedure for unicast mode of V2X communication over PC5 reference point.

Figure 8:
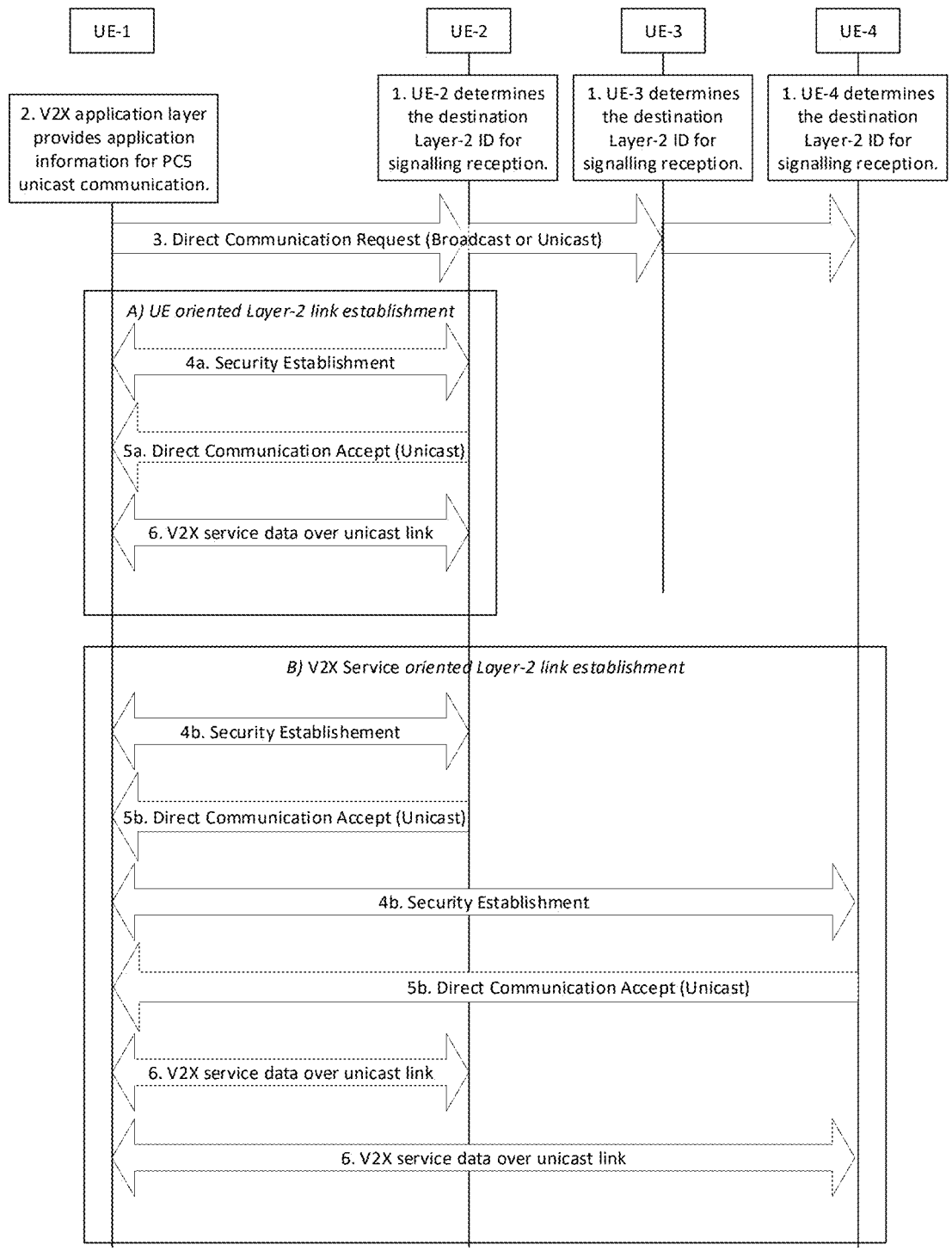
FIG. 8 is a reproduction of Figure 6.3.3.1-1 of 3GPP TS 23.287 V16.2.0.

[Figure 6.3.3.1-1 of 3GPP TS23.287 V16.2.0, Entitled "Layer-2 Link Establishment Procedure", is Reproduced as FIG. 8]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) (e.g. PSID(s) or ITS-AID(s)) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:
   Target User Info: the target UE's Application Layer ID (i.e. UE-2's Application Layer ID).

V2X Service Info: the information about V2X Service(s) requesting Layer-2 link establishment (e.g. PSID(s) or ITS-AID(s)).

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.
4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:
   IP Address Configuration: For IP communication, IP address configuration is required for this link and indicates one of the following values:
   "IPv6 Router" if IPv6 address allocation mechanism is supported by the initiating UE, i.e., acting as an IPv6 Router; or
   "IPv6 address allocation not supported" if IPv6 address allocation mechanism is not supported by the initiating UE.
   Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.
5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in Figure 6.3.3.1-1).

The Direct Communication Accept message includes:
Source User Info: Application Layer ID of the UE sending the Direct Communication Accept message.
QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).
If IP communication is used:
IP Address Configuration: For IP communication, IP address configuration is required for this link and indicates one of the following values:
"IPv6 Router" if IPv6 address allocation mechanism is supported by the target UE, i.e., acting as an IPv6 Router; or
"IPv6 address allocation not supported" if IPv6 address allocation mechanism is not supported by the target UE.
Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.
If both UEs (i.e. the initiating UE and the target UE) selected to use link-local IPv6 address, they shall disable the duplicate address detection defined in RFC 4862 [21].
NOTE 3: When either the initiating UE or the target UE indicates the support of IPv6 router, corresponding address configuration procedure would be carried out after the establishment of the layer 2 link, and the link-local IPv6 addresses are ignored.
The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. V2X service data is transmitted over the established unicast link as below:
The PC5 Link Identifier, and PFI are provided to the AS layer, together with the V2X service data.
Optionally in addition, the Layer-2 ID information (i.e. source Layer-2 ID and destination Layer-2 ID) is provided to the AS layer.
NOTE 4: It is up to UE implementation to provide the Layer-2 ID information to the AS layer.
UE-1 sends the V2X service data using the source Layer-2 ID (i.e. UE-1's Layer-2 ID for this unicast link) and the destination Layer-2 ID (i.e. the peer UE's Layer-2 ID for this unicast link).
NOTE 5: PC5 unicast link is bi-directional, therefore the peer UE of UE-1 can send the V2X service data to UE-1 over the unicast link with UE-1.

[ . . . ]

Figure 9:
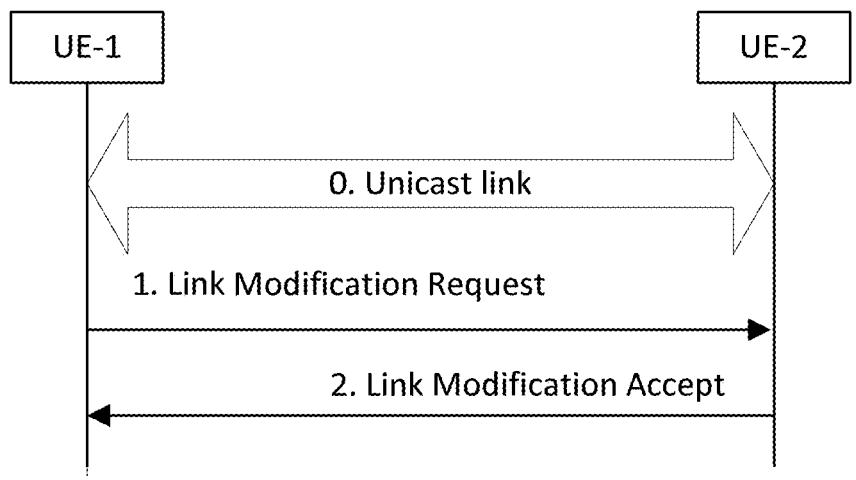
FIG. 9 is a reproduction of Figure 6.3.3.4-1 of 3GPP TS 23.287 V16.2.0.

6.3.3.4 Layer-2 Link Modification for a Unicast Link
Figure 6.3.3.4-1 shows the layer-2 link modification procedure for a unicast link. This procedure is used to:
add new V2X service(s) to the existing PC5 unicast link.
remove V2X service(s) from the existing PC5 unicast link.
add new PC5 QoS Flow(s) in the existing PC5 unicast link.
modify existing PC5 QoS Flow(s) in the existing PC5 unicast link.
remove existing PC5 QoS Flow(s) in the existing PC5 unicast link.
[Figure 6.3.3.4-1 of 3GPP TS 23.287 V16.2.0, Entitled "Layer-2 Link Modification Procedure", is Reproduced as FIG. 9]

0. UE-1 and UE-2 have a unicast link established as described in clause 6.3.3.1.
1. The V2X application layer in UE-1 provides application information for PC5 unicast communication. The application information includes the V2X service type(s) (e.g. PSID(s) or ITS-AID(s)) of the V2X application(s) and the initiating UE's Application Layer ID. The target UE's Application Layer ID may be included in the application information. If UE-1 decides to reuse the existing PC5 unicast link as specified in clause 5.2.1.4, so decides to modify the unicast link established with UE-2, UE-1 sends a Link Modification Request to UE-2.
The Link Modification Request message includes:
a) To add new V2X service(s) to the existing PC5 unicast link:
V2X Service Info: the information about V2X Service(s) to be added (e.g. PSID(s) or ITS-AID(s)).
QoS Info: the information about PC5 QoS Flow(s) for each V2X Service to be added. For each PC5 QoS Flow, the PFI and the corresponding PC5 QoS parameters (i.e. PQI and conditionally other parameters such as MFBR/GFBR, etc).
b) To remove a V2X service(s) from the existing PC5 unicast link:
V2X Service Info: the information about V2X Service(s) to be removed (e.g. PSID(s) or ITS-AID(s)).
c) To add new PC5 QoS Flow(s) in the existing PC5 unicast link:
V2X Service Info: the information about V2X Service(s) that needs to add new QoS Flows (e.g. PSID(s) or ITS-AID(s)).
QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc).
d) To modify PC5 QoS Flow(s) in the existing PC5 unicast link:
QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc.).

e) To remove PC5 QoS Flow(s) in the existing PC5 unicast link:
   PFIs.
2. UE-2 responds with a Link Modification Accept message.
   The Link Modification Accept message includes:
      For case a), case c) and case d) described in step 1:
         QoS Info: the information about PC5 QoS Flow(s). For each PC5 QoS Flow, the PFI and the corresponding PC5 QoS parameters (i.e. PQI and conditionally other parameters such as MFBR/GFBR, etc).
      The V2X layer of each UE provides information about the unicast link modification to the AS layer. This enables the AS layer to update the context related to the modified unicast link.

3GPP TS 38.836 specifies Sidelink-based UE-to-UE relay as follows:

5 Sidelink-Based UE-to-UE Relay 5.1 Scenario, Assumption and Requirement

The UE-to-UE Relay enables the coverage extension of the sidelink transmissions between two sidelink UEs and power saving. The coverage scenarios considered in this study are the following:
1) All UEs (Source UE, Relay UE, Destination UE) are in coverage.
2) All UEs (Source UE, Relay UE, Destination UE) are out-of-coverage.
3) Partial coverage whereby at least one of the UEs involved in relaying (Source UE, Relay UE, Destination UE) is in-coverage, and at least one of the UEs involved in relaying is out-of-coverage.

RAN2 will strive for a common solution to the in- and out-of-coverage cases. For the UE-to-UE Relay, the scenario where UEs can be in coverage of the different cell is supported.

Figure 5.1-1 shows the scenarios considered for UE-to-UE Relay. In FIG. 5.1-1, coverage implies that the Source/Destination UE and/or UE-to-UE Relay UE are in coverage and can access the network on Uu.

Figure 10:
FIG. 10 is a reproduction of Figure 5.1-1 of 3GPP TS 38.836 V17.0.0.

[Figure 5.1-1 of 3GPP TS 38.836 V17.0.0, Entitled "Scenarios for UE-to-UE Relay (where the Coverage Status is not Shown)", is Reproduced as FIG. 10]

NR sidelink is assumed on PC5 between the Remote UE(s) and the UE-to-UE Relay. Cross-RAT configuration/control of Source UE, UE-to-UE Relay and Destination UE is not considered, i.e., eNB/ng-eNB do not control/configure an NR Source UE, Destination UE or UE-to-UE Relay UE. For UE-to-UE Relay, this study focuses on unicast data traffic between the Source UE and the Destination UE.

Configuring/scheduling of a UE (Source UE, Destination UE or UE-to-UE Relay UE) by the SN to perform NR sidelink communication is out of scope of this study.

For UE-to-UE Relay, it is assumed that the Remote UE has an active end-to-end connection via only a single Relay UE at a given time.

Relaying of data between a Source UE and a Destination UE can occur once a PC5 link is established between the Source UE, UE-to-UE Relay, and Destination UE.

No restrictions are assumed on the RRC states of any UEs involved in UE-to-UE Relaying. The requirement of service continuity is only for UE-to-Network Relay, but not for UE-to-UE Relay, during mobility in this release.

5.2 Discovery

Model A and model B discovery model as defined in clause 5.3.1.2 of TS 23.303 [3] are supported for UE-to-UE Relay, and integrated PC5 unicast link establishment procedure can be supported based on SA2 conclusion. The protocol stack of discovery message is described in Figure 5.2-1.

Figure 11:
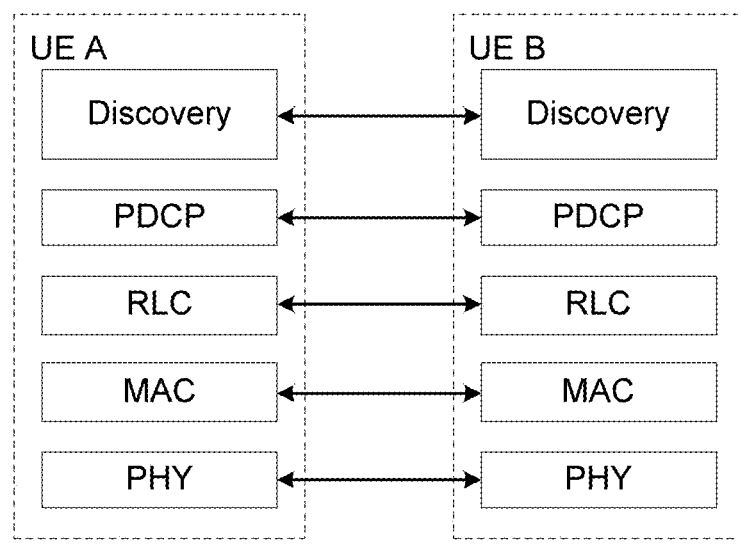
FIG. 11 is a reproduction of Figure 5.2-1 of 3GPP TS 38.836 V17.0.0.

[Figure 5.2-1 of 3GPP TS 38.836 V17.0.0, Entitled "Protocol Stack of Discovery Message for UE-to-UE Relay", is Reproduced as FIG. 11]

Relay UE or Remote UE is allowed to transmit discovery message when triggered by upper layer.

Both Remote UE and Relay UE can rely on pre-configuration unless relevant radio configuration is provided by network, either via system information or dedicated signalling.

Resource pool to transmit discovery message can be either shared with or separated from resource pool for data transmission.

For both shared resource pool and separated resource pool, a new LCID is introduced for discovery message i.e. discovery message is carried by a new SL SRB.

Within separated resource pool discovery messages are treated equally with each other during LCP procedure.

5.3 Relay (Re-)Selection Criteria and Procedure

The baseline solution for relay (re-)selection is as follow:
Radio measurements at PC5 interface are considered as part of relay (re)selection criteria.

Remote UE at least uses the radio signal strength measurements of sidelink discovery messages to evaluate whether PC5 link quality of a Relay UE satisfies relay selection and reselection criterion.

When Remote UE is connected to a Relay UE, it may use SL-RSRP measurements on the sidelink unicast link to evaluate whether PC5 link quality with the Relay UE satisfies relay reselection criterion.

Further details on the PC5 radio measurements criteria, e.g., in case of no transmission on the sidelink unicast link can be discussed in WI phase. How to perform RSRP measurement based on RSRP of discovery message and/or SL-RSRP if Remote UE has PC5-RRC connection with Relay UE can be decided in WI phase.

For relay (re-)selection, Remote UE compares the PC5 radio measurements of a Relay UE with the threshold which is configured by gNB or preconfigured. Higher layer criteria also need to be considered by Remote UE for relay (re-)selection, but details can be left to SA2 to decide. Relay (re-)selection can be triggered by upper layers of Remote UE.

Relay reselection should be triggered if the NR Sidelink signal strength of current Sidelink relay is below a (pre)configured threshold. Also, relay reselection may be triggered if RLF of PC5 link with current Relay UE is detected by Remote UE.

The above-described baseline for relay (re)selection apply to both L2 and L3 relay solutions. Additional AS layer criteria can be considered in WI phase for both L2 and L3 UE-to-UE Relay solutions.

For relay (re-)selection, when Remote UE has multiple suitable Relay UE candidates which meet all AS-layer & higher layer criteria and Remote UE need to select one Relay UE by itself, it is up to UE implementation to choose one Relay UE.

As captured in TR 23.752, solution #8 and solution #50 in TR 23.752 are taken as baseline solution for L2 and L3 UE-to-UE Relay reselection, and solution #8 and solution #11 in TR 23.752 are taken as baseline solution for L3 UE-to-UE Relay selection.

5.4 Relay/Remote UE Authorization

RAN2 concludes that authorization of both Relay UE and Remote UE has no RAN2 impact.

5.5 Layer-2 Relay
5.5.1 Architecture and Protocol Stack

For L2 UE-to-UE Relay architecture, the protocol stacks are similar to L2 UE-to-Network Relay other than the fact that the termination points are two Remote UEs. The protocol stacks for the user plane and control plane of L2 UE-to-UE Relay architecture are described in Figure 5.5.1-1 and Figure 5.5.1-2.

An adaptation layer is supported over the second PC5 link (i.e. the PC5 link between Relay UE and Destination UE) for L2 UE-to-UE Relay. For L2 UE-to-UE Relay, the adaptation layer is put over RLC sublayer for both CP and UP over the second PC5 link. The sidelink SDAP/PDCP and RRC are terminated between two Remote UEs, while RLC, MAC and PHY are terminated in each PC5 link.

Figure 12:
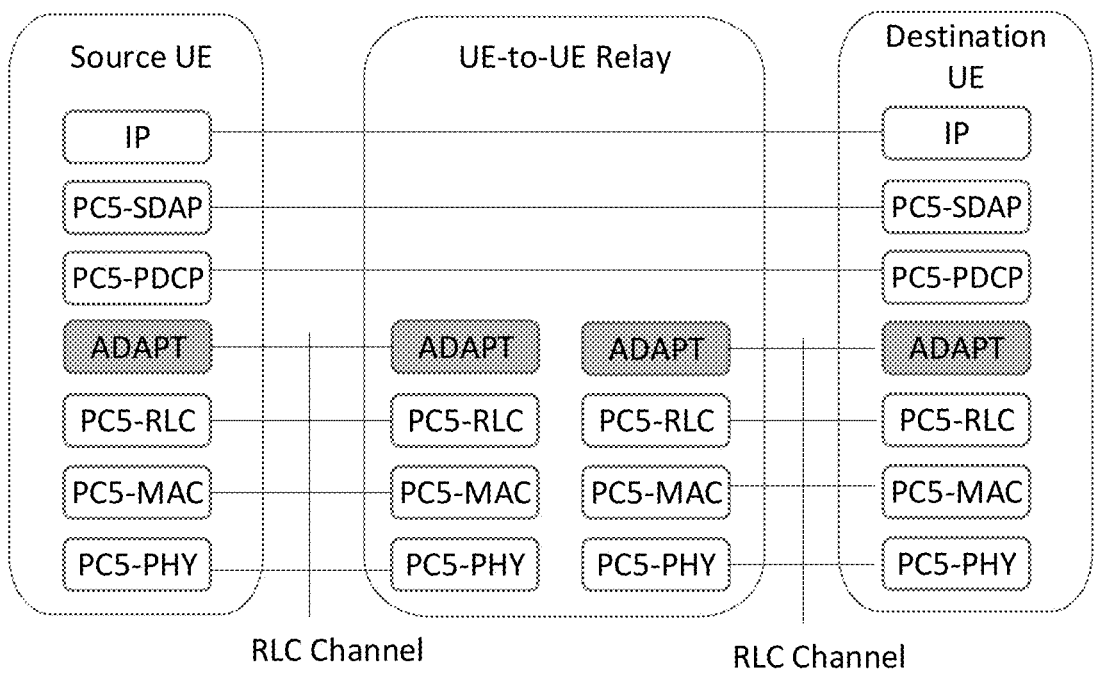
FIG. 12 is a reproduction of Figure 5.5.1-1 of 3GPP TS 38.836 V17.0.0.

[Figure 5.5.1-1 of 3GPP TS 38.836 V17.0.0, Entitled "User Plane Protocol Stack for L2 UE-to-UE Relay", is Reproduced as FIG. 12]

Figure 13:
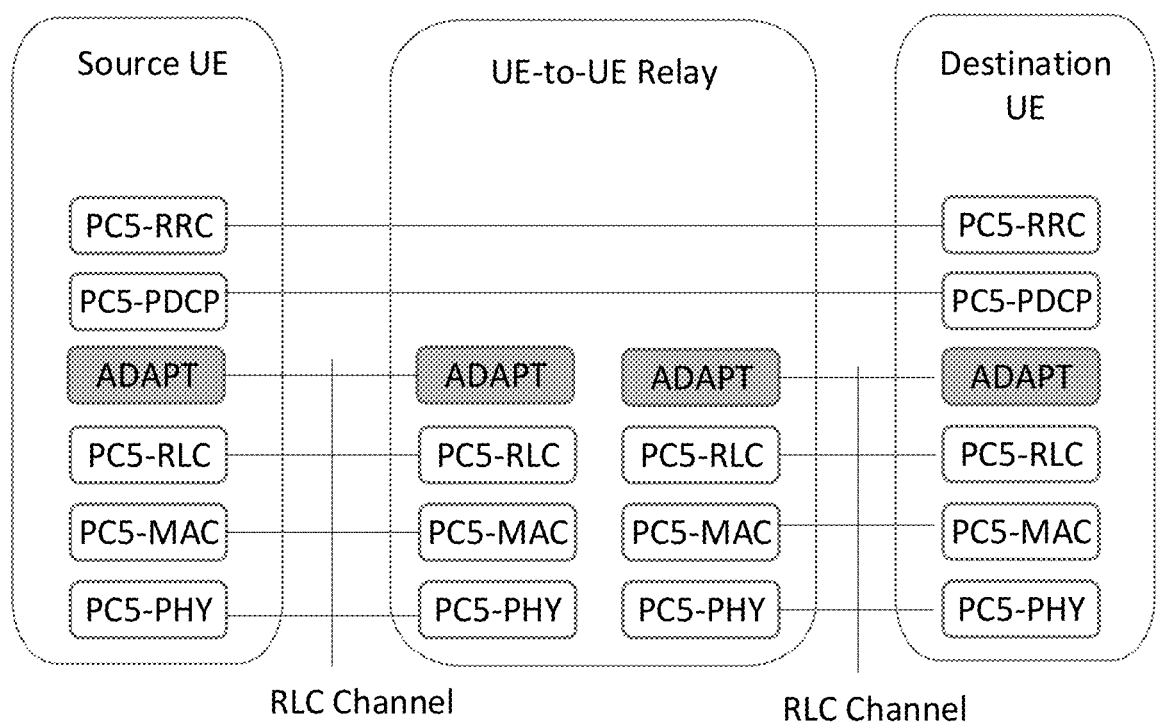
FIG. 13 is a reproduction of Figure 5.5.1-2 of 3GPP TS 38.836 V17.0.0.

[Figure 5.5.1-2 of 3GPP TS 38.836 V17.0.0, Entitled "Control Plane Protocol Stack for L2 UE-to-UE Relay", is Reproduced as FIG. 13]

For the first hop of L2 UE-to-UE Relay:
- The N:1 mapping is supported by first hop PC5 adaptation layer between Remote UE SL Radio Bearers and first hop PC5 RLC channels for relaying.
- The adaptation layer over first PC5 hop between Source Remote UE and Relay UE supports to identify traffic destined to different Destination Remote UEs.

For the second hop of L2 UE-to-UE Relay:
- The second hop PC5 adaptation layer can be used to support bearer mapping between the ingress RLC channels over first PC5 hop and egress RLC channels over second PC5 hop at Relay UE.
- PC5 Adaptation layer supports the N:1 bearer mapping between multiple ingress PC5 RLC channels over first PC5 hop and one egress PC5 RLC channel over second PC5 hop and supports the Remote UE identification function.

For L2 UE-to-UE Relay:
- The identity information of Remote UE end-to-end Radio Bearer is included in the adaptation layer in first and second PC5 hop.
- In addition, the identity information of Source Remote UE and/or the identity information of Destination Remote UE are candidate information to be included in the adaptation layer, which are to be decided in WI phase.

5.5.2 QoS

QoS handling for L2 UE-to-UE Relay is subject to upper layer, e.g. solution #31 in TR 23.752 studied by SA2.

5.5.3 Security

As described in clause 6.9.1.2 (Solution #9) of TR 23.752, in case of L2 UE-to-UE Relay, the security is established at PDCP layer in an end to end manner between UE1 and UE2. Security aspects require confirmation from SA3.

5.5.4 Control Plane Procedure

RAN2 consider the SA2 solution in TR 23.752[6] as baseline. Further RAN2 impacts can be discussed in WI phase, if any.

3GPP TS 38.331 specifies Sidelink RRC reconfiguration for NR sidelink communication as follows:

5.8.9.1 Sidelink RRC Reconfiguration
5.8.9.1.1 General

Figure 14:
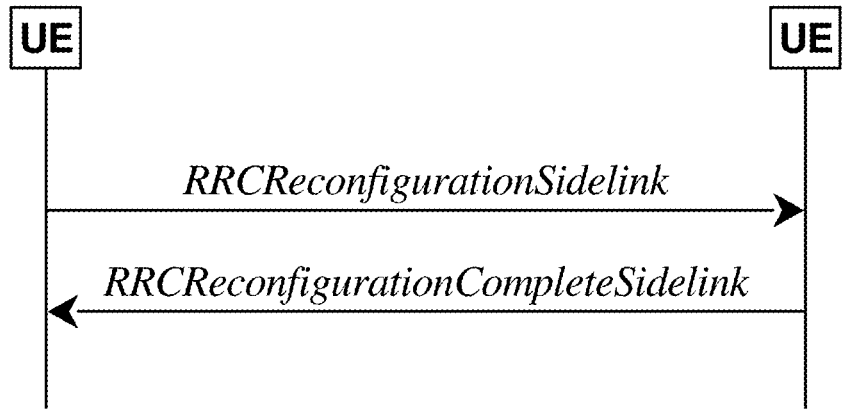
FIG. 14 is a reproduction of Figure 5.8.9.1.1-1 of 3GPP TS 38.331 V16.1.0.

[Figure 5.8.9.1.1-1 of 3GPP TS 38.331 V16.1.0, Entitled "Sidelink RRC Reconfiguration, Successful", is Reproduced as FIG. 14]

Figure 15:
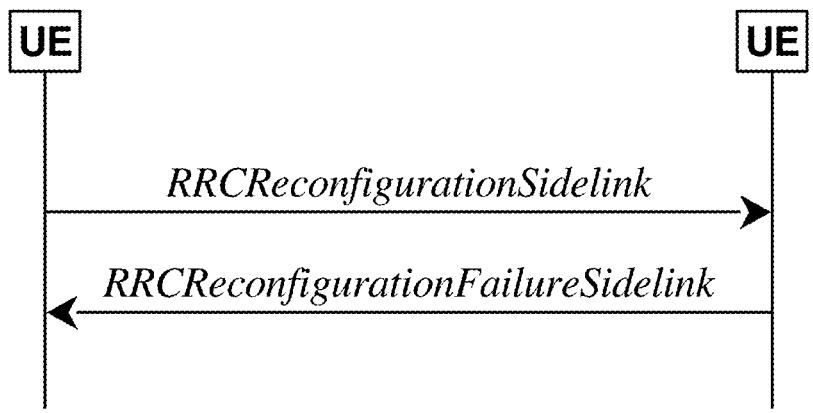
FIG. 15 is a reproduction of Figure 5.8.9.1.1-2 of 3GPP TS 38.331 V16.1.0.

[Figure 5.8.9.1.1-2 of 3GPP TS 38.331 V16.1.0, Entitled "Sidelink RRC Reconfiguration, Failure", is Reproduced as FIG. 15]

The purpose of this procedure is to modify a PC5-RRC connection, e.g. to establish/modify/release sidelink DRBs, to configure NR sidelink measurement and reporting, to configure sidelink CSI reference signal resources and CSI reporting latency bound. The UE may initiate the sidelink RRC reconfiguration procedure and perform the operation in sub-clause 5.8.9.1.2 on the corresponding PC5-RRC connection in following cases:

- the release of sidelink DRBs associated with the peer UE, as specified in sub-clause 5.8.9.1a.1;
- the establishment of sidelink DRBs associated with the peer UE, as specified in sub-clause 5.8.9.1a.2;
- the modification for the parameters included in SLRB-Config of sidelink DRBs associated with the peer UE, as specified in sub-clause 5.8.9.1.5a.2;
- the configuration of the peer UE to perform NR sidelink measurement and report.
- the configuration of the sidelink CSI reference signal resources and CSI reporting latency bound.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

Figure 16:
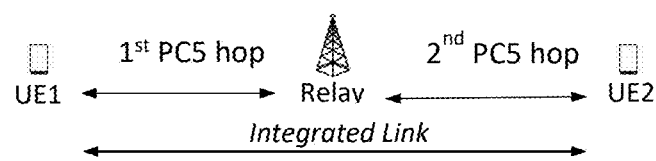
FIG. 16 is a diagram according to one exemplary embodiment.

Key issue #4 in 3GPP TR 23.752 describes support of UE-to-UE Relay in the following release (e.g. Release 17/18), which means a relay may be used to support communication between two UEs in case these two UEs cannot communicate with each other directly. It is supposed that a UE-to-UE Relay needs to establish one PC5 unicast link with each of a Source UE (i.e. the first PC5 hop) and a Target UE (i.e. the second PC5 hop) such that the integrated PC5 unicast link between the Source UE and the Target UE can support the concerned ProSe service as illustrated in FIG. 16.

Figure 5.5.1-1 (reproduced as FIG. 12) and Figure 5.5.1-2 (reproduced as FIG. 13) in 3GPP TS 38.836 describe the protocol stacks for the user plane and control plane of L2 UE-to-UE Relay architecture, which includes an adaptation layer to support multiple Source UEs to communicate with one Target UE via a UE-to-UE Relay and one Source UE to communicate with multiple Target UEs via the UE-to-UE Relay. 3GPP TS38.836 further specifies an identity information of (Remote UE) end-to-end Radio Bearer is included in the header of the adaptation layer Protocol Data Unit (PDU) in first and second PC5 hop. In addition, the identity information of Source Remote UE and/or the identity information of Target Remote UE are candidate information to be included in the header of the adaptation layer PDU, which are to be decided in the following WI phase.

Figure 17:
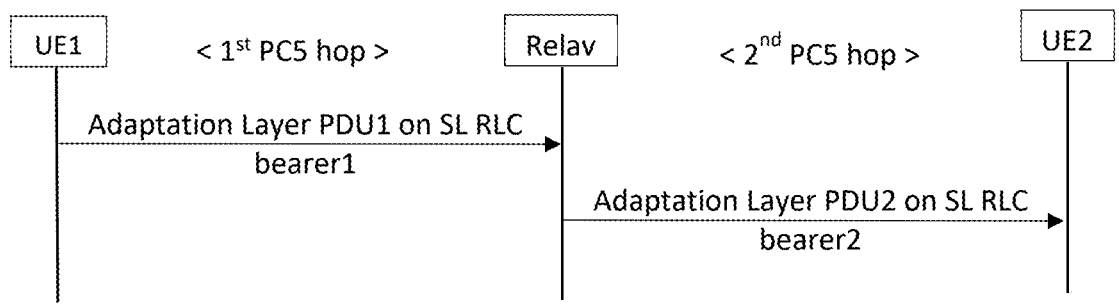
FIG. 17 is a messaging diagram according to one exemplary embodiment.

It is supposed that when transmitting an adaptation layer PDU, the Source UE may need to include information (e.g. a local Identity/Identifier (ID) of the Target UE) in a header of the PDU to identify the Target UE so that the UE-to-UE Relay can forward the Service Data Unit (SDU) included in the PDU to the Target UE on the right sidelink Radio Link Control (RLC) bearer (or logical channel) in the second PC5 hop because separate sidelink RLC bearers may be established for communication between the UE-to-UE Relay and different Target UEs. In addition to the identity information of the Target UE, an ID of the end-to-end Radio Bearer included in the header by the Source UE may also be used by the UE-to-UE Relay to determine the sidelink RLC bearer. It may not be necessary for the header to include information to identify the Source UE. On the other hand, the UE-to-UE Relay may need to include information (e.g. a local ID of the Source UE) to identify the Source UE in a header of the adaptation layer PDU sent to the Target UE so that the Target UE can deliver the SDU included in the PDU to the right sidelink PDCP entity because separate sidelink PDCP entities are established in the Target UE for different Source UEs. The end-to-end Radio Bearer ID may also be included in the header of the adaptation layer PDU by the UE-to-UE Relay. It may not be necessary for the header to include information to identify the Target UE. FIG. 17 illustrates an example of the above concepts.

To fulfil the above concept, a remote UE needs to know the local ID, used in the adaptation layer, of the other remote UE when communicating with the other remote UE via a UE-to-UE relay, while the UE-to-UE relay needs to know the local IDs of both remote UEs. It does not seem necessary for the remote UE to know its own local ID. In addition, each local ID of the other remote UEs associated with a concerned remote UE may be unique within the scope of the concerned remote UE. It is also possible that each local ID of the remote UEs may be unique within the scope of the UE-to-UE Relay. Since the UE-to-UE relay needs to know the local IDs of both paired remote UEs, one potential solution is for the UE-to-UE Relay to assign or allocate the local ID for each remote UE and then provide the local ID of one remote UE to the other remote UE. Alternatively, one remote UE may assign or allocate the local ID for the other remote UE and then provide it to the UE-to-UE relay. In this situation, the UE-to-UE relay needs to maintain the associated local IDs for each remote UE.

Basically, each remote UE may maintain a UE context of the other remote UE which communicates with it via the UE-to-UE Relay to support the relaying operation. The UE context may include an upper layer ID (e.g. a UE's application layer ID), a local ID, and an application/service ID. In other words, the association between upper layer IDs and local IDs are maintained in each remote UE so as to support the relaying operation. The UE-to-UE Relay may also maintain the UE context of each remote UE. The UE context in the UE-to UE relay may also include a Layer-2 ID of the concerned remote UE in addition to an upper layer ID (e.g. a UE's application layer ID), a local ID, and an application/ service ID. An upper layer ID of a UE may be an application layer ID of the UE, which is not a Layer-2 ID.

Figure 18:
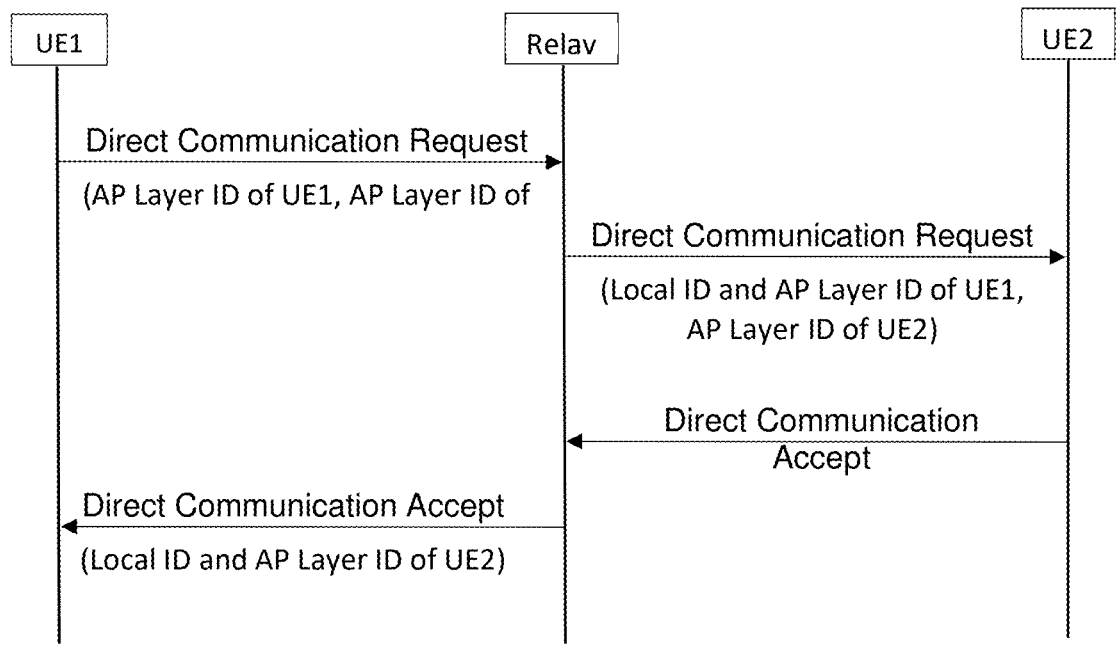
FIG. 18 is a messaging diagram according to one exemplary embodiment.

For the potential solution, the UE-to-UE Relay may assign or allocate the local ID for each remote UE and then provide the local ID of one remote UE to the other remote UE during the integrated unicast link establishment procedure with two paired remote UEs. In one embodiment, the UE-to-UE Relay may transmit the local ID to a remote UE in a Direct Communication Request message or a Direct Communication Accept message. More specifically, after receiving a Direct Communication Request message from a source remote UE, the UE-to-UE Relay includes a local ID of the source remote UE in another Direct Communication Request message and transmits it to the target remote UE. Both Direct Communication Request messages may also include an upper layer ID (e.g. a UE's Application Layer ID) of the source remote UE and an upper layer ID (e.g. a UE's Application Layer ID) of the target remote UE. And after receiving a Direct Communication Accept message from the target remote UE, the UE-to-UE Relay includes the local ID of the target remote UE in another Direct Communication Accept message and transmits it to the source remote UE. Both Direct Communication Accept messages may also include the upper layer ID (e.g. the UE's Application Layer ID) of the target remote UE. The Direct Communication Accept message from the target remote UE or both Direct Communication Accept messages may also include the upper layer ID of the source remote UE, considering that there may be multiple source remote UEs. After these two remote UEs obtain the local ID of the other remote UE, data exchange on the user plane and message exchange on the control plane via the UE-to-UE Relay may start. FIG. 18 illustrates the above solutions.

It is also possible for the UE-to-UE Relay to provide the local ID of the other remote UE to a remote UE after the unicast link between the UE-to-UE Relay and the remote UE has been established. The local ID may be transmitted in a PC5-S message (e.g. a Link Identifier Update Request message, a Link Modification Request message), a sidelink RRC message (e.g. a RRC Reconfiguration Sidelink message), or a sidelink MAC control element (to be specified). In addition to the local ID, the PC5-S message, sidelink RRC message, or sidelink MAC control element may also include an upper layer ID (e.g. a UE's application layer ID) of the other remote UE for associating the local ID with the upper layer ID of the other remote UE.

After the remote UE (UE1) connects with the other remote UE (UE2) via the UE-to-UE Relay, data (or traffic) from one remote UE may be forwarded by the UE-to-UE Relay UE to the other remote UE. It is possible that the remote UE may want to further connect with another remote UE (UE3) via the same UE-to-UE Relay UE. It is not clear so far how this is done.

Since a PC5 unicast link between the remote UE and the UE-to-UE Relay has been established to support data communication between these two remote UEs, one potential solution to the above issue is for the remote UE to initiate a Layer-2 link modification procedure toward the UE-to-UE Relay so that the UE-to-UE Relay can further establish another PC5 unicast link with another remote UE. The UE-to-UE Relay may initiate the PC5 unicast link establishment procedure toward another remote UE directly or may initiate a discovery procedure to discover another remote UE first before initiating the PC5 unicast link establishment procedure. A security establishment procedure may be performed between the UE-to-UE Relay and another remote UE during the PC5 unicast link establishment procedure. After the above procedures have been finished, the remote UE may further initiate an end-to-end link establishment procedure toward another remote UE via the UE-to-UE Relay so as to establish an end-to-end security between the remote UE and another remote UE. However, the end-to-end link establishment may be optional.

In one embodiment, the Link Modification Request message transmitted by the remote UE to the UE-to-UE Relay for initiating the Layer-2 link modification procedure may include the User info of another remote UE (Target User Info). The Link Modification Request message may also include the User info of the remote UE (Source User Info), a Relay Service Code (RSC), and/or Quality of Service (QoS) info1. In response to reception of the Link Modification Request message, the UE-to-UE Relay may initiate the discovery procedure to discover another remote UE or initiate the PC5 unicast link establishment procedure toward another remote UE directly.

The Discovery Solicitation message transmitted by the UE-to-UE Relay to another remote UE for initiating the discovery procedure may include the User info of another remote UE (Target User Info). The Discovery Solicitation message may also include the User info of the remote UE (Source User Info), the User info of the UE-to-UE Relay, and/or the Relay Service Code (RSC). In response, another remote UE may reply with a Discovery Response message.

The Direct Communication Request message transmitted by the UE-to-UE Relay to another remote UE for initiating the PC5 unicast link establishment procedure may include the User info of the remote UE (Source User Info) and the User info of another remote UE (Target User Info). The Direct Communication Request message may also include the User info of the UE-to-UE Relay, the Relay Service Code (RSC), security info1, and/or QoS info1. In response, another remote UE may reply with a Direct Communication Accept message. When receiving the Direct Communication Accept message from another remote UE, the UE-to-UE Relay may transmit a Link Modification Accept message to the remote UE. The Link Modification Accept message may include the User info of the remote UE (Source User Info), the User info of another remote UE (Target User Info), the Relay Service Code (RSC), and/or QoS info2.

Figure 19:
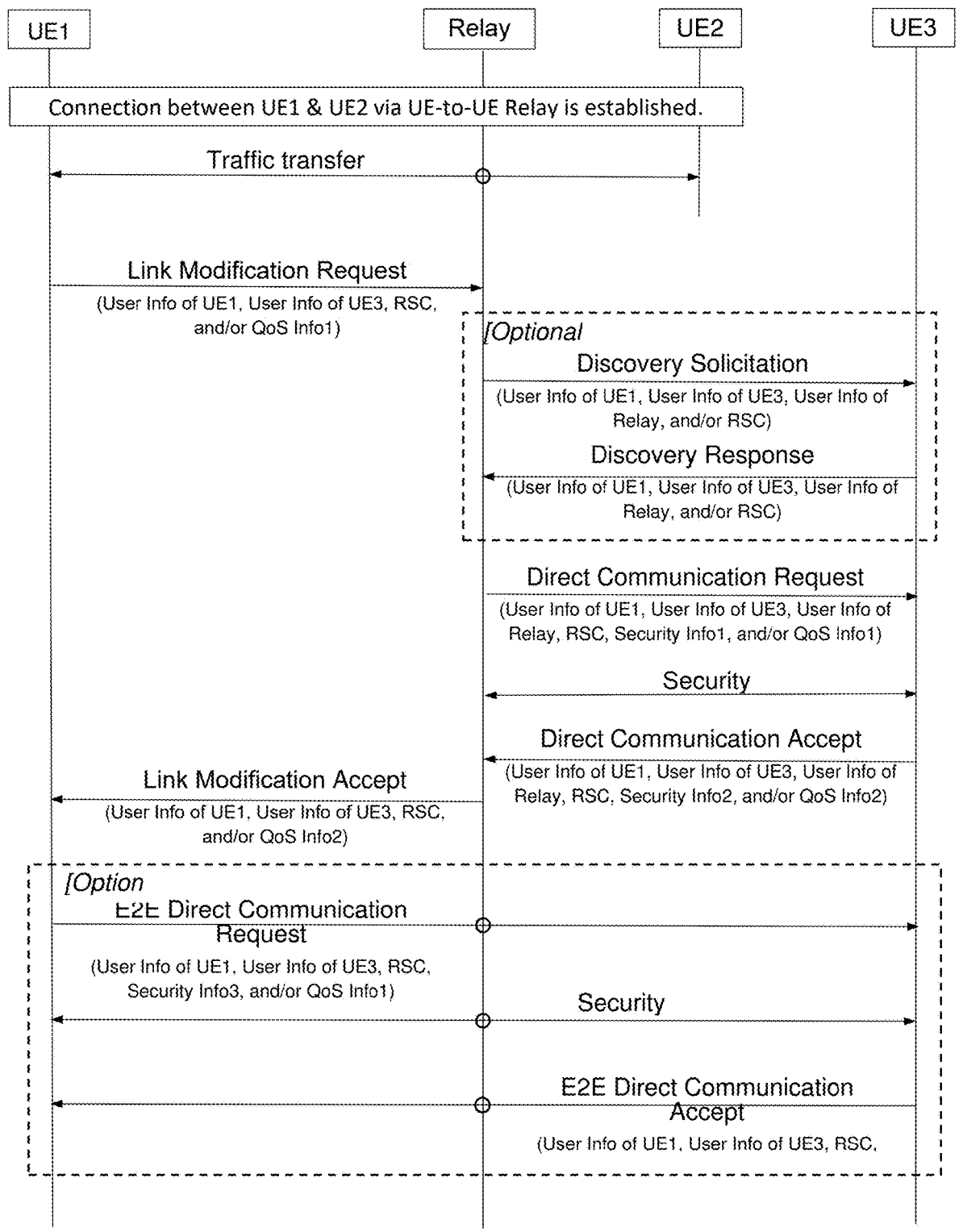
FIG. 19 is a messaging diagram according to one exemplary embodiment.

The Relay Service Code (RSC) is a parameter identifying the service requested by the source remote UE (when initiating the connection with the target remote UE). QoS info2 may be different from QoS info1 and it may be generated by another remote UE according to at least QoS info1 from the source remote UE. FIG. 19 illustrates the above solutions.

Figure 20:
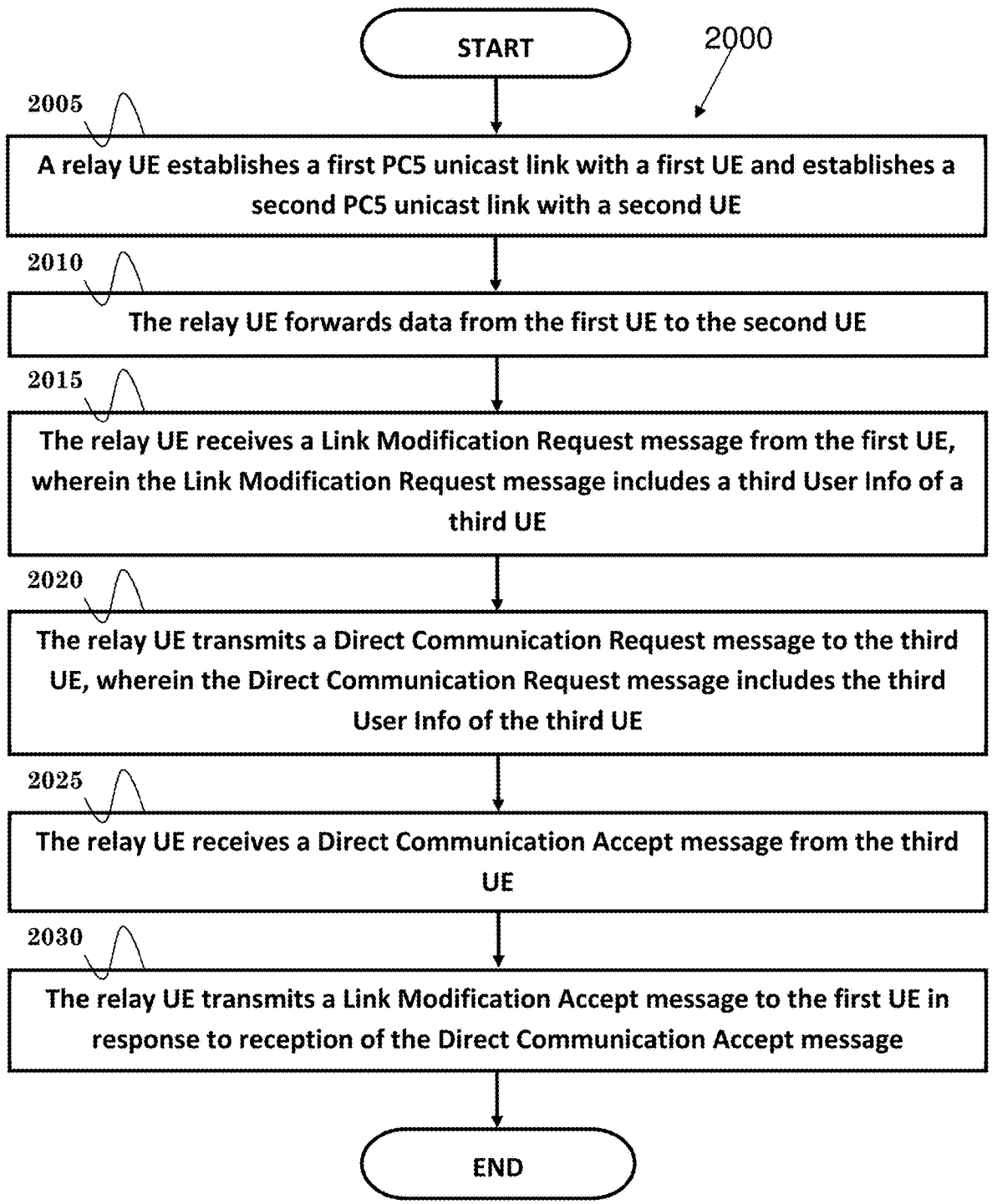
FIG. 20 is a flow diagram according to one exemplary embodiment.

FIG. 20 is a flow chart 2000 illustrating a method for a relay User Equipment (UE) supporting connection with another UE. In step 2005, a relay UE establishes a first PC5 unicast link with the first UE and establishes a second PC5 unicast link with a second UE. In step 2010, the relay UE forwards data from the first UE to the second UE. In step 2015, the relay UE receives a Link Modification Request message from the first UE, wherein the Link Modification Request message includes a third User Info of a third UE. In step 2020, the relay UE transmits a Direct Communication Request message to the third UE, wherein the Direct Communication Request message includes the third User Info of the third UE. In step 2025, the relay UE receives a Direct Communication Accept message from the third UE. In step 2030, the relay UE transmits a Link Modification Accept message to the first UE in response to reception of the Direct Communication Accept message.

In one embodiment, the Link Modification Request message could include a first User Info of the first UE, a Relay Service Code (RSC), and/or a first Quality of Service (QoS) Info. The Link Modification Accept message could include the first User Info of the first UE, a third User Info of the third UE, the RSC, and/or a second Quality of Service (QoS) Info.

In one embodiment, the Direct Communication Request message could include a first User Info of the first UE, a User Info of the relay UE, a Relay Service Code (RSC), a first security info, and/or a first Quality of Service (QoS) Info. The Direct Communication Accept message could include the first User Info of the first UE, a third User Info of the third UE, the User Info of the relay UE, the RSC, a second security info, and/or the second QoS Info.

In one embodiment, the relay UE could transmit a Discovery Solicitation message to the third UE after reception of the Link Modification Request message and before transmission of the Direct Communication Request message, wherein the Discovery Solicitation message includes the third User Info of the third UE. The relay UE could receive a Discovery Response message from the third UE after transmitting the Discovery Solicitation message.

In one embodiment, the Discovery Solicitation message could include a first User Info of the first UE, a User Info of the relay UE, and/or Relay Service Code (RSC). The Discovery Response message includes the first User Info of the first UE, a third User Info of the third UE, the User Info of the relay UE, and/or the RSC.

In one embodiment, an end-to-end unicast link establishment procedure is performed between the first UE and the third UE via the relay UE. The Link Modification Request message could be received using a Layer-2 ID of the first UE and a Layer-2 ID of the relay UE. The Link Modification Accept message could be transmitted using the Layer-2 ID of the first UE and the Layer-2 ID of the relay UE.

Referring back to FIGS. 3 and 4, in one exemplary embodiment of a relay UE, the relay UE 300 includes a program code 312 stored in the memory 310. The CPU 308 could execute program code 312 to enable the relay UE (i) to establish a first PC5 unicast link with a first UE, and to establish a second PC5 unicast link with a second UE, (ii) to forward data from the first UE to the second UE, (iii) to receive a Link Modification Request message from the first UE, wherein the Link Modification Request message includes a third User Info of a third UE, (iv) to transmit a Direct Communication Request message to the third UE, wherein the Direct Communication Request message includes the third User Info of the third UE, (v) to receive a Direct Communication Accept message from the third UE, and (vi) to transmit a Link Modification Accept message to the first UE in response to reception of the Direct Communication Accept message. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE) supporting connection with another UE, comprising:

the relay UE establishes a first PC5 unicast link with a first UE and establishes a second PC5 unicast link with a second UE;

the relay UE forwards data from the first UE to the second UE;

the relay UE receives a Link Modification Request message from the first UE, wherein the Link Modification Request message includes a third User Info of a third UE;

the relay UE transmits a Direct Communication Request message to the third UE in response to receiving the Link Modification Request message from the first UE, wherein the Direct Communication Request message includes a first User Info of the first UE, a User Info of the relay UE, a Relay Service Code (RSC), and the third User Info of the third UE, and wherein the third User Info of the third UE is an Application Layer identity (ID) of the third UE;

the relay UE receives a Direct Communication Accept message from the third UE; and the relay UE transmits a Link Modification Accept message to the first UE in response to reception of the Direct Communication Accept message, wherein the Link Modification Accept message includes the third User Info of the third UE.

2. The method of claim 1, wherein the Link Modification Request message includes a first User Info of the first UE, a Relay Service Code (RSC), and/or a first Quality of Service (QOS) Info.

3. The method of claim 2, wherein the Link Modification Accept message includes the first User Info of the first UE, the RSC, and/or a second Quality of Service (QOS) Info.

4. The method of claim 1, wherein the Direct Communication Request message includes a first security info, and/or a first Quality of Service (QOS) Info.

5. The method of claim 4, wherein the Direct Communication Accept message includes the first User Info of the first UE, the third User Info of the third UE, the User Info of the relay UE, the RSC, a second security info, and/or a second QoS Info.

6. The method of claim 1, further comprising:

the relay UE transmits a Discovery Solicitation message to the third UE after reception of the Link Modification Request message and before transmission of the Direct Communication Request message, wherein the Discovery Solicitation message includes the third User Info of the third UE; and the relay UE receives a Discovery Response message from the third UE after transmitting the Discovery Solicitation message.

7. The method of claim 6, wherein the Discovery Solicitation message includes a first User Info of the first UE, a User Info of the relay UE, and/or a Relay Service Code (RSC).

8. The method of claim 7, wherein the Discovery Response message includes the first User Info of the first UE, the third User Info of the third UE, the User Info of the relay UE, and/or the RSC.

9. The method of claim 1, wherein the Link Modification Request message is received using a Layer-2 ID of the first UE and a Layer-2 ID of the relay UE.

10. The method of claim 9, wherein the Link Modification Accept message is transmitted using the Layer-2 ID of the first UE and the Layer-2 ID of the relay UE.

11. A relay User Equipment (UE), comprising:
a control circuit;
a processor installed in the control circuit; and
a memory installed in the control circuit and operatively coupled to the processor;
wherein the processor is configured to execute a program code stored in the memory to:
establish a first PC5 unicast link with a first UE and establishes a second PC5 unicast link with a second UE;
forward data from the first UE to the second UE;
receive a Link Modification Request message from the first UE, wherein the Link Modification Request message includes a third User Info of a third UE;
transmit a Direct Communication Request message to the third UE in response to receiving the Link Modification Request message from the first UE, wherein the Direct Communication Request message includes a first User Info of the first UE, a User Info of the relay UE, a Relay Service Code (RSC), and the third User Info of the third UE, and wherein the third User Info of the third UE is an Application Layer identity (ID) of the third UE;
receive a Direct Communication Accept message from the third UE; and
transmit a Link Modification Accept message to the first UE in response to reception of the Direct Communication Accept message, wherein the Link Modification Accept message includes the third User Info of the third UE.

12. The relay UE of claim 11, wherein the Link Modification Request message includes a first User Info of the first UE, a Relay Service Code (RSC), and/or a first Quality of Service (QOS) Info.

13. The relay UE of claim 12, wherein the Link Modification Accept message includes the first User Info of the first UE, the RSC, and/or a second Quality of Service (QOS) Info.

14. The relay UE of claim 11, wherein the Direct Communication Request message includes a first security info, and/or a first Quality of Service (QoS) Info.

15. The relay UE of claim 14, wherein the Direct Communication Accept message includes the first User Info of the first UE, the third User Info of the third UE, the User Info of the relay UE, the RSC, a second security info, and/or a second QoS Info.

16. The relay UE of claim 11, wherein the processor is further configured to execute a program code stored in the memory to:
transmit a Discovery Solicitation message to the third UE after reception of the Link Modification Request message and before transmission of the Direct Communication Request message, wherein the Discovery Solicitation message includes the third User Info of the third UE; and
receive a Discovery Response message from the third UE after transmitting the Discovery Solicitation message.

17. The relay UE of claim 16, wherein the Discovery Solicitation message includes a first User Info of the first UE, a User Info of the relay UE, and/or a Relay Service Code (RSC).

18. The relay UE of claim 17, wherein the Discovery Response message includes the first User Info of the first UE, the third User Info of the third UE, the User Info of the relay UE, and/or the RSC.

19. The relay UE of claim 11, wherein the Link Modification Request message is received using a Layer-2 ID of the first UE and a Layer-2 ID of the relay UE.

20. The relay UE of claim 19, wherein the Link Modification Accept message is transmitted using the Layer-2 ID of the first UE and the Layer-2 ID of the relay UE.

* * * * *